ary to what would be ex-
United States Patent Office 3,576,860
Patented Apr. 27, 1971

3,576,860
PREPARATION OF CHLOROACETYL CHLORIDE
Dimitri A. Zazaris, Belleville, Ill., assignor to
Monsanto Company, St. Louis, Mo.
No Drawing. Filed Dec. 20, 1967, Ser. No. 691,975
Int. Cl. C07c 53/20
U.S. Cl. 260—539                                        9 Claims

ABSTRACT OF THE DISCLOSURE

Chlorination of acetic anhydride and acetic anhydride-acetic acid mixtures in the presence of lithium chloride to yield a mixture of monochloroacetyl chloride and monochloroacetic acid having a small concentration of the polychlorinated derivatives.

---

Many of the present commercial herbicides, such as the chloroacetamides and "2,4-D," utilize a monochloroacetyl chloride or monochloroacetic acid as an intermediate. Inclusion of the polychlorinated acids or acid chlorides in the intermediate, yields a product which has decreased biological activity and different physical properties which interfere in the formulation of the herbicide. The monochloroacetic acid and monochloroacetyl chloride should, therefore, have a minimum of the polychlorinated derivatives, which should not exceed about 2%, in order to obtain maximum biological activity and ease of formulation.

Separation of the monochloro acids and acid chlorides from the polychlorinated derivatives by conventional means is an expensive and difficult operation due to the close similarities in physical properties. As an alternate, the preparation of monochloroacetic acid and acid chlorides was modified to decrease the amount of the polychlorinated derivatives formed to an acceptable level.

In the prior art, acetic anhydride and/or acetyl chloride have been added to catalyze the chlorination of acetic acid and partially suppresses the formation of the polychlorinated derivatives. The chlorination of acetic anhydride alone results in the formation of a large concentration (9 to 11%) of the polychlorinated derivatives. The addition of inorganic salts also only partially suppresses the formation of the polychlorinated derivatives, even in the presence of acetic anhydride.

These modifications of the chlorination reaction do not reduce the concentration of polychlorinated derivatives to an acceptable level unless the reaction is stopped when only approximately 80 to 85% of the acetic acid-acetic anhydride has been converted. This requires the separation and recycling of a large amount of unreacted starting material.

It is, therefore, an object of this invention to provide a novel synthetic process for the preparation of monochloroacetic acid and monochloroacetyl chloride which eliminates the above disadvantages.

It is another object of this invention to provide a process for preparing monochloroacetic acid and monochloroacetyl chloride having less than 4.0 and 1.5 weight percent of dichloroacetic acid or dichloroacetyl chloride in the acid and acid chloride fractions, respectively.

It is a further object of this invention to provide a process for preparing monochloroacetic acid and the monochloroacetyl chloride in which at least 95% of the starting compound is converted to the desired monochloro derivative.

It is a still further object of this invention to provide a process for the preparation of monochloroacetic acid and monochloroacetyl chloride from acetic anhydride in which the weight ratio of monochloroacetyl chloride to monochloroacetic acid approaches the theoretical 119:100.

Further objects, aspects and advantages of the invention will be apparent from the description which follows.

Chlorination of acetic acid alone in the absence of a catalyst by prior art processes usually requires relatively high temperatures, 110 to 120° C., in order for the reaction to occur. Temperature in this range, however, result in a high yield of dichloroacetic acid. In order to reduce the reaction temperature, acetic anhydride, acetyl chloride, inorganic salts or combination of the three have been added to the acetic acid. Reaction ompositions of 85 weight percent acetic anhydride and 15 weight percent acetic acid have been utilized. In the chlorination of this mixture, the product obtained was predominantly monochloroacetic acid. This is contrpected since theoretically acetic anhydride should give 1 mole of acid and 1 mole of acid halide per mole of anhydride. The use of many inorganic salts did not materially change this result.

It has previously been determined that the low yield of monochloroacetyl chloride is due to the interactions of the acid chloride and any free acid, resulting in the formation of predominantly the monochloroacetic acid. When acetic anhydride alone is chlorinated, the product contains more chloro acids than chloro acid halides and the concentration of dichlorinated derivatives is higher than when a mixture with acetic acid is chlorinated. These side reactions are disadvantageous if the product desired is the acid halide.

It has now been found that the introduction of lithium chloride alone or in combination with hydrogen chloride to a reaction mixture containing 0 to about 17 percent of acetic acid and about 83 to 100 percent of acetic anhydride yields a mixture of monochloroacetic acid and monochloroacetyl chloride, which contains less than 1.5 percent of the dichloro derivative in the acid halide, in a weight ratio which approaches theory (1.19 for acetic anhydride and 0.89 for the 83/17 mixture).

In the chlorination of acetic anhydride or acetic acid-acetic anhydride mixtures, it is generally held that many different reactions are occurring simultaneously, but not in the same degree or rate, among which are:

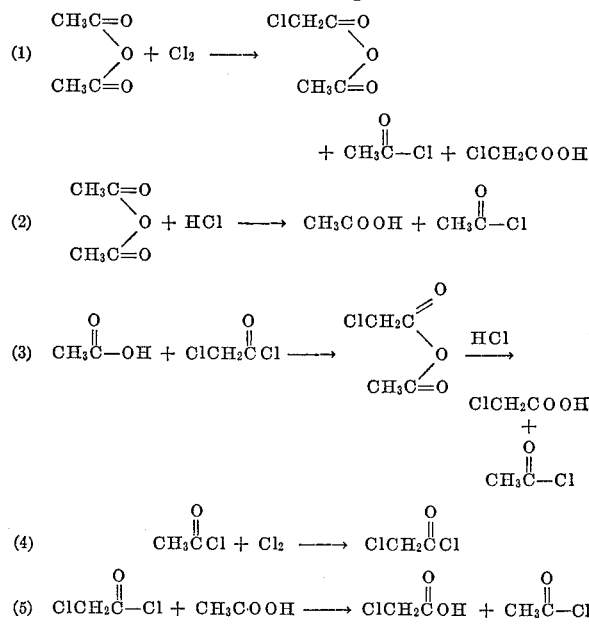

As can be seen from Reactions 1, 3 and 5, the formation of monochloroacetic acid is favored over the formation of monochloroacetyl chloride, and thus more acid is formed than acid halide.

In accordance with the present invention, the chloride ion probably interacts with the monochloric anhydride (Equations 1 and 3) to give the products monochloroacetyl chloride and acetic acid. The formation of the acid halide is thus favored and the acid halide/acid weight ratio approaches theory.

In the prior art, chlorination reactions were terminated after about 80 to 85% of the reaction mixture was converted to the chlorinated product in order to reduce the quantity of dichlorinated compounds. The unreacted acid or anhydride thus had to be separated from the reaction medium. In the present invention, chlorination of the reaction composition to a conversion of at least 95% is possible without any material increase in dichloro formation. In actual practice, quantitative conversions have been obtained.

Reaction temperature for the procedure of the present invention is in the approximate range of 70 to 100° C., with the preferred temperature range being about 80 to 90° C. Temperatures outside this range can be utilized but lead to an increase in dichlorinated derivatives at the higher temperature and longer reaction times and increase in dichlorinated products at lower temperatures.

Chlorine is initially introduced into the reaction mixture, during the induction period, at a relatively slow rate. During this period of the reaction, the mixture attains the coloration of chlorine. After the reaction has started, this coloration will disappear. The chlorine rate is then increased and adjusted to a rate that will provide complete chlorination in about 8 to 9 hours. Completion of chlorination is evidenced by the presence of free chlorine in the off gas.

The amount of lithium chloride added to the reaction mixture is in the range of about 0.1 to 2.5 percent by weight of the reaction composition. For reactions utilizing acetic anhydride, the preferred range of lithium chloride is about 1.0 to 2.5% by weight and for a mixture of 83% acetic anhydride and 17% acetic acid, the preferred lithium chloride range is about 0.1 to 1.5% by weight.

Amounts of lithium chloride in excess of 2.5 percent by weight of the reaction medium can be used, however, its suppressive effect on the formation of dichloroacetyl chloride and dichloroacetic acid is not materially greater than that which exists at 2.5 percent.

Recovery of the monochloroacetyl chloride and the monochloroacetic acid is by conventional means such as fractional distillation. The boiling points of the acid and acid halide (189° C. and 108–110° C., respectively) at atmospheric pressure are significantly divergent for ease in separation by distillation.

Inert solvents, such as the chlorinated hydrocarbons, e.g. carbon tetrachloride can be used but are not necessary since both acetic anhydride and acetic acid are mutually miscible liquids. The lithium chloride is sufficiently soluble in the reaction mixtures which thus again eliminates the need of a solvent.

The general procedure for the preparation of monochloroacetyl chloride and monochloroacetic acid, according to the present invention is as follows:

Percents in the following example, Table I, and throughout the specification are by weight and are based on the weight of the reaction composition.

In a suitable vessel, equipped with a temperature measuring means, a reflux condenser, an off-gas outlet fitted with a reflux condenser, and a chlorine sparger connected to a gas measuring means, was added the acetic anhydride or acetic anhydride-acetic acid mixture and the required amount of lithium chloride, and the batch heated to about 90° C. Chlorine was introduced into the mixture at a slow rate for the first 1½ hours. During this induction period, only small amounts of chlorine were absorbed and the reaction mixture attained the typical yellowish-green coloration of chlorine. After the reaction was initiated, the coloration disappeared and the chlorine was absorbed as it was added. The chlorine rate was increased and adjusted to provide a reaction time of about 8 to 9 hours. The temperature was controlled within the approximate range of 80 to 90° C. during the reaction time. Chlorine addition was discontinued when the off-gas attained the chlorine coloration. The specific gravity of the mixture at this period was approximately 1.3607 at 75° C.

The results obtained from this procedure using various mixtures of acetic anhydride and acetic acid and various amounts of lithium chloride is reported in Table I.

It will be noted that in some runs hydrogen chloride is added as a co-catalyst. The use of hydrogen chloride reduces the induction time from about 1½ hours to about 15 minutes. Hydrogen chloride, when utilized, is added to the reaction mixture prior to the chlorine addition. Hydrogen chloride is added to the reaction medium in an amount up to about 15 percent by weight of the reaction medium with the optimum amount being about 5 to 10 percent. The procedure with hydrogen chloride is as previously described with the exception that the induction period is reduced to about 15 minutes.

TABLE I

| Reaction mixture | Catalyst percent | MCA recovered | | CAC recovered | |
|---|---|---|---|---|---|
| | | MCA percent | DCA percent | CAC percent | DCAC percent |
| Acetic anhydride | LiCl 1.0 | 98.6 | 4.0 | 89.8 | 1.5 |
| | LiCl 2.4; HCl 6.0 | 99.2 | 3.0 | 89.6 | 1.3 |
| | LiCl 1.0; HCl 0.5 | 98.9 | 4.0 | 89.6 | 1.5 |
| | No catalyst | 88.6 | 14.5 | 82.2 | 9.0 |
| Acetic anhydride 83% acetic acid 17% | LiCl 0.5 | 96.6 | 3.2 | 94.0 | 1.0 |
| | LiCl 0.2 | 95.9 | 4.1 | 93.2 | 1.2 |
| | No catalyst | 93.2 | 10.5 | 91.2 | 3.2 |

NOTE: MCA=Monochloroacetic acid; DCA=Dichloroacetic acid; CAC= Monochloroacetyl chloride; DCAC= Dichloroacetyl chloride.

In Table I, it will be noted that the use of lithium chloride, with acetic anhydride, reduces the amount of dichloroacetyl chloride from a high of 9.0% to 1.5% (with 1.0% LiCl). Dichloroacetic acid is reduced from 14.5% to 4.0% under the same conditions.

When a mixture of acetic acid (17%) and acetic anhydride (83%) is used, the addition of lithium chloride reduces the amount of the dichloroacetyl chloride from 3.2% to 1.0 (0.5% LiCl) and the amount of dichloroacetic acid from 10.5 to 3.2%. Increasing the amount of lithium chloride used would further reduce the concentration of dichloroacetic acid.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

The embodiments of the invention which an exclusive property or privilege is claimed are defined as follows:

1. A process for preparing monochloroacetyl chloride and monochloroacetic acid comprising chlorinating with chlorine gas a composition consisting of about 83 to 100 percent by weight acetic anhydride and 0 to about 17 percent by weight acetic acid, at a temperature in the approximate range of 70 to 100° C., in the presence of lithium chloride and hydrogen chloride, said hydrogen chloride being present in an amount of from 0 to 15 percent by weight of the reaction mixture, to form a mixture of monochloroacetyl chloride and monochloroacetic acid; and recovering the monochloroacetyl chloride and monochloroacetic acid separately from the reaction medium.

2. A process in accordance with claim 1, in which the mixture chlorinated consists of acetic anhydride.

3. A process in accordance with claim 2, in which the lithium chloride is present in an amount of about 1.0 to 2.5 percent by weight.

4. A process in accordance with claim 3, in which the hydrogen chloride is present in an amount of about 5 to 10 percent by weight.

5. A process in accordance with claim 4, in which said temperature is in the approximate range of 80 to 90° C.

6. A process in accordance with claim 1, in which the mixture chlorinated consists of 83 percent by weight acetic anhydride and 17 percent by weight acetic acid.

7. A process in accordance with claim 6, in which the lithium chloride is present in an amount of about 0.1 to 1.5 percent of the reaction mixture.

8. A process in accordance with claim 7, in which the hydrogen chloride is present in an amount of about 5 to 10 percent by weight.

9. A process in accordance with claim 8, in which the temperature is in the approximate range of 80 to 90° C.

References Cited

UNITED STATES PATENTS 2,966,525  12/1960  Steen _____ 260—654

FOREIGN PATENTS 138,864  1/1953  Sweden _____ 260—539

LORRAINE A. WEINBERGER, Primary Examiner

P. J. KILLOS, Assistant Examiner

U.S. Cl. X.R.

260—541, 544, 546